| United States Patent [19] | [11] | Patent Number: | 4,844,811 |
|---|---|---|---|
| Gotlieb et al. | [45] | Date of Patent: | Jul. 4, 1989 |

[54] METHOD FOR SEPARATING DISSOLVED ORGANIC COMPOUNDS FROM A SOLUTION

[76] Inventors: Isaac Gotlieb, 5 Balcam Ct., Roseland, N.J. 07068; Aharon Zidon, 27 Hamaalot Str., Givataim, Israel

[21] Appl. No.: 181,665

[22] Filed: Apr. 14, 1988

[51] Int. Cl.4 ...................... B01D 17/035; B01D 17/05
[52] U.S. Cl. ..................................... 210/703; 210/732; 210/774; 210/804
[58] Field of Search ............... 210/708, 703, 729, 804, 210/730, 801, 732–738, 727, 806, 753, 805, 767, 799, 773, 790, 774, 776; 166/244.1; 209/162–164, 166, 167, 171, 173, 175, 176

[56] References Cited

U.S. PATENT DOCUMENTS

| 3,862,663 | 1/1975 | Curtice et al. | 166/276 |
|---|---|---|---|
| 4,190,531 | 2/1980 | Falk | 210/753 |
| 4,265,308 | 5/1981 | Hedges et al. | 166/274 |
| 4,719,972 | 1/1988 | Hsueh | 166/303 |
| 4,734,205 | 3/1988 | Jacques et al. | 210/727 |
| 4,736,795 | 4/1988 | Karas | 166/274 |
| 4,741,835 | 5/1988 | Jacques et al. | 210/734 |

*Primary Examiner*—Frank Sever

[57] ABSTRACT

A process for separating dissolved organic solutes from a solution is provided. The process includes the steps of mixing the solution with a surfactant in order that the surfactant absorbs substantially all of the organic solutes and forms a surfactant/organic solute aggregate. The aggregate is then separated from the solution by either reducing the solubility of the surfactant, ultrafiltration of the solution or foam fractionation of the solution. If it is desired to re-use the surfactant, the surfactant/organic solute aggregate is further treated in order to desorb the organic solutes from the surfactant.

23 Claims, No Drawings

METHOD FOR SEPARATING DISSOLVED ORGANIC COMPOUNDS FROM A SOLUTION

BACKGROUND OF THE INVENTION

This invention relates to a new process for separating dissolved organic solutes from a water solution, and more particularly, to separating dissolved organic solutes using surfactants as a separating agent.

The use of surfactants, such as soap and synthetic detergents, for dissolving organic compounds, is well known in the art. Particularly, surfactant is applied to hydrophobic organic compounds (chemical substances which have a very low solubility in water) for the purpose either dissolving, emulsifying or dispersing the organic compounds in a water environment.

The ability of surfactants to act as mediators between hydrophobic chemicals and water is related to the surfactant's molecular structure, which contains a hydrophilic part, referred to as the "head", and a hydrophobic part, referred to as the "tail". The particular mechanism utilizes the attractive forces between the surfactant tail and the non-polar organic compounds, and the attractive forces between the surfactant head and the water molecules.

Another particular property of surfactant molecules which may be related to solubilization is aggregation to sub-micron droplets, referred to in the art as micelles. In a water environment, the surfactant molecules constituting the micelle are oriented with the hydrophilic heads towards the water, i.e., outwards, and the hydrophobic tails towards the interior of the micelle. Consequently, the micelle's interior is a hydrophobic microenvironment, capable of retaining organic solutes.

It is also well known to separate surfactant micelles from water by means of an ultrafiltration mechanism. This is typically used when studying the properties of surfactants, or the interaction between surfactants and various solutes. According to this technique, surfactants may be recovered from micellar solutions by passing the solution through an ultrafiltration membrane having a pore size smaller than the size of the micelles.

Additionally, separation of surfactants from water may also be achieved by a mechanism known as foam fractionation. According to this mechanism, liquids containing surfactants may be purified by passing a gas through the liquid, thereby generating a foam. The foam is collected and condensed by means of a mechanical foam breaker. The method is suitable for purifying dilute surfactant solutions, since the concentration of surfactant in the foam is higher than in the original liquid.

SUMMARY OF THE INVENTION

Generally speaking, in accordance with the invention, a process for separating dissolved organic compounds from a solution is provided. This process employs the use of surfactants as separating agents, which are mixed with the solution in order to cause the surfactant to adsorb substantially all of the organic solutes. The resulting surfactant/organic solute aggregate is then separated from the solution using appropriate physical and chemical processes. The aggregate may then be further treated in order to desorb the organic solutes from the surfactant so that the organic solutes can be collected and the surfactant can be recovered for repeated use in the inventive process.

Particularly, the mechanism chosen for separating the surfactant/organic solute aggregate from the solution may include solubility reduction of the surfactant, filtration of the solution and foam fractionation of the solution. Desorbing the organic solutes from the surfactant may be accomplished by stripping followed by solvent extraction.

Accordingly, it is an object of this invention to provide a method for isolating dissolved organic compounds from solution.

Another object of the present invention is to provide a method for substantially complete removal of surfactants from solution.

A further object of the invention is to provide a method of recovering surfactant for repeated use in a separation process.

Still another object of the invention is to produce a clean water effluent, which is free of surfactant as well as organic solutes.

Still other objects and advantages of the invention will, in part, be obvious, and will, in part, be apparent from the following description.

The invention accordingly comprises the several steps and the relation of one or more of such steps with respect to each of the others, as exemplified in the process hereinafter described, and the scope of the invention will be indicated in the claims.

DETAILED DESCRIPTION OF THE PREFERRED EMBODIMENT

In order to separate organic solutes from the water solution, it is first necessary to mix the solution with one or more surfactant compounds. Suitable surfactant compounds are chosen from anionic, cationic and non-ionic surfactants. Anionic and cationic surfactants have an adsorbtive affinity towards counter-ion solutes due to electrostatic forces. Non-ionic surfactants have solvating and adsorbtive properties due to their polarity, and also due to the formation of hydrogen bonds and the presence of Van Der Waals forces. As a result, depending on the organic solutes for which adsorption is desired, a suitable surfactant or mixture of surfactants may be formulated.

According to the present invention, the most suitable surfactants for adsorption of non-ionic organic solutes are non-ionic surfactants selected from alcohol ethoxylates, alkylphenol ethoxylates, ethylene oxide/propylene oxide block copolymers, fatty acid ethoxylates, fatty amine ethoxylates, fatty acid ethanolamides and fatty acid sorbitol esters.

The alcohol ethoxylates may be chosen from between 6 and 15 ethoxyl decyl to tridecyl alcohols.

The alkylphenol ethoxylates may be chosen from octyl and nonyl phenol ethoxylates.

The ethylene oxide/propylene oxide block co-polymers may be chosen from between 5 and 30 ethoxyl propylene oxide and 5 and 30 propoxyl ethylene oxide compounds having a molecular weight of between 1000 and 4000.

The fatty acid ethoxylates may be chosen from between 5 and 20 ethoxyl oleate and stearate.

The fatty acid amine ethoxylates may be chosen from between 5 and 30 ethoxyl oleyl amine.

The fatty acid ethanolamides may be chosen from between 5 and 20 ethoxyl sorbitan oleate, laurate and stearate.

The fatty acid sorbitol esters may be chosen from between 5 and 20 ethoxyl oleil ethanol amindes.

For adsorption of ionic organic solutes, the preferred surfactant formulations are mixtures of non-ionic surfactants of the types listed above, in combination with either cationic surfactants or anionic surfactants of the type described hereinbelow.

According to the present invention, the preferred cationic surfactants are selected from alkylbenzyl ammonium halides, alkyl ammonium ethoxylates, and quarternary alkyl ammonium halides.

The alkyl benzyl ammonium halides are chosen from C12 to C18 alkyl-dimethyl benzyl ammonium chlorides.

The alkyl ammonium ethoxylates are chosen from 10 to 15 ethoxyl C12 to C14 amines.

The quarternary alkyl ammonium halides are chosen from C12 to C14 alkyl ammonium chlorides.

According the present invention, the most suitable anionic surfactants are selected from alkylbenzene sulfonates, lignosulfonates, petroleum sulfonates, alkyl sulfates, alkylaryl polyether sulfonates, and alkylaryl polyether sulfates.

The alkylbenzene sulfonates are chosen from C10 to C16 alkyl benzene sulfonates.

The lignosulfonates are chosen from mixtures having a molecular weight between 200 and 500.

The petroleum sulfonates are chosen from mixtures having a molecular weight between 300 and 500.

The alkyl sulfates are chosen from C12 to C18 alkyl sulfonates.

The alkylaryl polyether sulfonates are chosen from mixtures having molecular weight between 300 and 700.

The alkylaryl polyether sulfates are chosen from mixtures having molecular weight between 300 and 700.

In accordance with the invention, when mixing the aqueous solution containing the organic solutes with the surfactant, it is desirable that substantially all of the organic molecules be adsorbed. In order to obtain complete adsorption, surfactant is usually added in excess. Particularly, the mole ratio of surfactant to organic solute should be greater than about one to one, and preferably between about two to one and five to one. Furthermore, as part of the process, the concentration of the surfactant in the resulting solution should be between about 0.1 and 20 weight percent, and preferably between 0.5 and 10 weight percent.

After the surfactant formulation is mixed with the solution in order that substantially complete adsorption of the organic solutes is obtained, a surfactant/organic solute aggregate is formed, and the resulting mixture is then appropriately treated in order to separate the surfactant/organic solute aggregate from the solution. This is achieved by reducing the solubility of the surfactant, or by filtering the solution or by applying a foam fractionation process, in an appropriate combination, as described below.

Solubility reduction of the surfactant is preferably achieved by heating the mixture to a temperature above the solubility limit of the surfactant (known as the CP, or "cloud point") The preferred temperature is between about 5° Fahrenheit above the CP and the boiling temperature of the mixture. Once the temperature is raised to this level, the solubility of the surfactant/organic solute aggregate is substantially reduced, which causes the aggregate to separate. After transfer to an appropriate settling vessel, the mixture separates into two phases: a surfactant phase containing the adsorbed solutes (as part of a surfactant/organic solute aggregate), and a water phase.

Alternatively, solubility reduction may be achieved by the addition of an electrolyte, an acid or an alkali, or a suitable combination thereof.

If an electrolyte is chosen for solubility reduction, it may be selected from the metal halides such as sodium chloride, calcium chloride and potassium chloride. The electrolyte is preferably added in an amount between about one to five weight percent.

If an acid is used for solubility reduction, it can be chosen from conventional strong acids, to lower the pH to less than 7.0, and preferably between 1.0 and 7.0. Examples of such acids include hydrochloric acid and sulfuric acid.

If an alkali is used for solubility reduction, it can be added to increase the pH above 7.0, and preferably between 7.0 and 13.0. The preferred alkali is soldium hydroxide, although other suitable alkalis include calcium hydroxide and aluminum hydroxide.

A second mechanism for separating the surfactant/organic solute aggregate from the solution is by the filtration thereof. Preferably, the mixture is circulated through an ultrafiltration device in which the filter comprises a membrane with a porosity rating between about 5,000 and 1,000,000 molecular weight cut-off (MWC). When the mixture is passed through the filter, the filter retains the surfactant/organic solute aggregate. The ultrafiltration retentate may thereafter be used again as part of the adsorption step.

A third mechanism for separating the surfactant/organic solute aggregate from the solution is foam fractionation. In particular, the mixture is transferred to a suitable foam fractionation column, through which a continuous bubbling of gas is supplied in a counter-current flow. Suitable gases for bubbling include air, nitrogen and carbon dioxide. The gas bubbles carry the surfactant/organic solute aggregate as a foam into an overhead chamber that is equipped with a mechanical foam breaker to condense the foam.

It is possible first to reduce the solubility of the surfactant/organic solute aggregate in order to achieve phase separation and then apply an ultrafiltration process to the water phase. This combined treatment has the advantage of producing a sharp separation, i.e., a highly concentrated surfactant/organic solute aggregate and a water phase which is almost free of residual surfactant.

It is also possible to first use solubility reduction in order to achieve phase separation and then apply foam fractionation to the water phase. This may be advantageous if the solution contains fine suspended solids or colloidal matter which is difficult to filter out. A further possibility is first to employ a solubility reduction technique, and then apply to the water phase an ultrafiltration process as well as foam fractionation, as described in detail above.

Each of the foregoing alternatives requires that solubility reduction be used first. Thus, in each case a water phase, which may contain some residual surfactant, and a surfactant phase, which contains substantially all of the surfactant/organic solute aggregate, are produced. The water phase may then be treated using at least one of the steps of ultrafiltration or foam fractionation. If both steps are applied to the water phase resulting from the preceding solubility reduction step, it is preferred that ultrafiltration be applied first, although foam fractionation can precede ultrafiltration. The application of either ultrafiltration or foam fractionation, or both, to the water phase enables separation of residual surfactant from the water so that a water product is produced which is substantially free from surfactant.

If ultrafiltration is used, after solubility reduction, the resulting retentate may thereafter be re-used in the adsorption step. Similarly, if foam fractionation is applied after solubility reduction, the condensed foam may thereafter be re-used as part of the adsorption step, although the condensed foam may also first be passed through an ultrafiltration membrane, and the resulting retentate reused in the adsorption step.

It is also possible, as set forth above, to utilize only the steps of ultrafiltration and foam fractionation (without first performing the step of solubility reduction) in order to achieve separation of the surfactant/organic solute aggregate from the original aqueous solution. Particularly, the mixture may be passed through an ultrafiltration membrane. Filtration produces a retentate containing surfactant/organic solute aggregate, and a filtrate comprising water with some residual surfactant. The filtrate may be sent to a foam fractionation column in order to separate the residual surfactant, which may then be used again in the adsorption step.

Alternatively, foam fractionation may be applied first, before ultrafiltration. In this case, after adsorption, the mixture is sent to a foam fractionation column, which separates the surfactant/organic aggregate, as well as residual surfactant, out of the solution. The surfactant fraction may then be sent through an ultrafiltration membrane and the resulting filtrate may then be recycled through the foam fractionation column, while the retentate contains the surfactant/organic solute aggregate.

The application of the foregoing mechanisms, either alone or in an appropriate combination, results in a water product which is substantially free of both the organic solutes and the surfactants.

Once the surfactant/organic solute aggregate is separated from the solution, it may be desirable to treat the aggregate in order to desorb the organic solutes from the surfactants and thereby enable re-use of the surfactant formulation in the initial adsorption step. Mechanisms for achieving this include stripping followed by solvent extraction, as described in more detail below.

In stripping, the surfactant/organic solute aggregate is transferred to an appropriate stripping vessel where excess residual water and volatile solutes, if present, are removed by distillation. Particularly, if volatile solutes are present, the vapor distillate of the volatile solutes is condensed and collected in a volatiles accumulator, where non-polar solutes are separated from water.

If the distillate consists only of water (no volatile solutes), the vapor may be returned without condensation to the solubility reduction vessel for recovery of its heat content.

After stripping, the remaining surfactant/organic solute aggregate undergoes solvent extraction. In particular, the surfactant/organic solute aggregate is transferred to a suitable solvent extraction vessel for extraction with a suitable organic solvent. The effect is the desorption of the organic solutes from the surfactant and into the solvent. This produces a solvent phase (including the organic solutes) and a surfactant phase.

The extraction solvent should preferably have the following properties:
 a. high miscibility with solute
 b. low miscibility with surfactants
 c. high volatility relative to the solutes
 d. high volatility relative to the surfactants
 e. chemical stability
 f. non-corrosivity Suitable solvents are selected from light petroleum fractions such as C-6 to C-10 alkanes, lower alcohols such as methanol, and lower ketones.

The surfactant phase resulting from the solvent extraction step may be transferred to a solvent stripper where residual solvent is distilled. The stripped surfactant may then be re-used in the adsorption step.

The solvent phase which results from the solvent extraction step may be fed to a distillation column. The solvent is distilled and may be re-used as part of the solvent extraction step. The resulting organic solute fraction is then recovered, for further processing as desired.

After stripping and extraction, the recovered organic solutes (both volatile and non-volatile) may be disposed of in an appropriate manner, as is known in the art.

Various modifications of the above-described method may be employed depending upon the organic solutes being treated. For example, if only volatile organic solutes are present in the aqueous solution, then the solvent extraction step may be omitted. As another example, if a water/surfactant solution is used for washing contaminated soil, or for scrubbing gas streams, then both the ultrafiltration and foam fractionation steps may be omitted.

In order to better illustrate the invention, the following examples are provided.

EXAMPLES

Example 1

A 1000 ml sample of a water solution containing benzene, toluene and p-xylene (BTX) in the following concentrations: benzene 1870 ppm, toluene 670 ppm, and p-xylene 210 ppm, was treated by adding 45 g octylphenol decaethoxylate surfactant in a distilling flask and stirring for 2-3 minutes until the surfactant was completely dissolved. The flask was equipped with a reflux condenser, in order to contain volatile components (benzene, in this example).

The mixture was then heated in the flask by means of a heating mantle to 80° C., then transferred to a separatory funnel and allowed to separate for 5 minutes into a water phase and surfactant phase. The top (water) layer was analyzed for BTX by UV spectroscopy and compared to standard solutions of benzene, toluene and xylene at 254 nm. Its BTX content was found to be below the detection limit (approximately 5 ppm). This represents 99.9% removal of the original BTX content in the solution.

Example 2

The water layer from Example 1 was further treated by ultrafiltration (UF), using a hollow fiber cartridge filter with a 5000 MWC polysulfone membrane. The solution was circulated through the filter by means of a centrifugal pump and the trans-membrane pressure was maintained at 12 psi. The UF filtrate was analyzed by UV spectroscopy against standard solutions at 254 nm. It was found to contain 210 ppm of residual surfactant.

Example 3

The filtrate solution from Example 2 was further treated to remove the residual surfactant by foam fractionation. The solution was placed in a glass column equipped with a porous glass disk at the bottom. Air was pressurized through the porous disk, forming small bubbles which elevated through the solution in the column. The top of the column was piped into a beaker equipped with a foam breaker, consisting of a stainless steel flat disk rotating at 1800 rpm. The air flow through the column was maintained until the foaming ceased, for a total of about 8 volumes of air per volume of solution contained in the column. The liquid in the column was then analyzed for BTX and surfactant contents. Both were undetectable.

Example 4

The surfactant phase from Example 1 was stripped of volatile solutes by distillation at 98°–102° C. The distillation was carried out in a distillation flask equipped with a water-cooled condenser. The distillate was collected and analyzed for BTX content. It was found to contain 2.14 g BTX, representing a 78% recovery of the original BTX.

Example 5

The distillation residue from Example 4 was extracted by adding 200 ml n-hexane and then stirred for 2–3 minutes. The mixture was then transferred to a separatory funnel and allowed to settle for 5–6 minutes. The top layer was removed and the extraction was repeated two more times in the same manner. The hexane extracts were combined and analyzed for BTX content. The extract was found to contain 0.53 g BTX, representing approximately 19% of the original BTX content.

It will thus be seen that the objects set forth above, among those made apparent from the preceding description, are efficiently attained, and since certain changes may be in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A process for separating at least one organic solute from a solution comprising:
   mixing said solution with a surfactant present in excess as compared to the amount of said at least one organic solute in order that said solute is adsorbed by said surfactant to form a surfactant/organic solute aggregate; and
   separating said aggregate from said solution in order to form a surfactant fraction and a water fraction by reducing the solubility of the surfactant to form a separate surfactant phase and a water phase; filtering said solution; and foam fractioning of said solution.

2. The process of claim 1, wherein said surfactant is present in an amount greater than about one mole per mole of said at least one organic solute.

3. The process of claim 2, wherein said surfactant is present between about two moles to one and five moles to one mole of organic solutes.

4. The process of claim 1, wherein said surfactant comprises surfactant solutes selected from the group including anionic, catonic and non-ionic surfactants.

5. The process of claim 4, wherein said nonionic surfactants are chosen from alcohol ethoxylates, alkylphenol ethoxylates, ethylene oxide/propylene oxide block copolymers, fatty acid ethoxylates, fatty amine ethoxylates, fatty acid ethanolamides and fatty acid sorbitol esters.

6. The process of claim 4, wherein said cationic surfactants are chosen from alkyl benzyl ammonium halides, alkyl ammonium ethoxylates and quarternary alkyl ammonium halides.

7. The process of claim 4, wherein said anionic surfactants are chosen from alkylbenzene sulfonates, lignsulfonates, petroleum sulfonates, alkyl sulfates, alkylaryl polyether sulfonates and alkylaryl polyether sulfates.

8. The process of claim 4, wherein said at least one organic solute is a non-ionic organic solute, and wherein said mixing step comprises mixing said solution with non-ionic surfactants.

9. The process of claim 4, wherein said at least one organic solute is an ionic organic solute, and wherein said mixing step comprises mixing said solution with a surfactant mixture chosen from non-ionic surfactants combined with either cationic or anionic surfactants.

10. The process of claim 1, wherein said solubility reducing step comprises heating said solution to a temperature above the solubility limit of the surfactant.

11. The process of claim 10, wherein said temperature is between about 5° F. above the solubility limit temperature and the boiling temperature of the mixture.

12. The process of claim 1, wherein said solubility reduction step comprises adding at least one of an electrolyte, an acid and an alkali to said solution.

13. The process of claim 12, wherein said electrolyte is selected from the group including metal halides.

14. The process of claim 12, wherein said acid is selected from the group including hydrochloric acid and sulfuric acid.

15. The process of claim 12, wherein said alkali is selected from the group including sodium hydroxide, calcium hydroxide and aluminum hydroxide.

16. The process of claim 1, wherein said filtering step comprises circulating said solution through an ultrafiltration filter.

17. The process of claim 16, wherein said filter comprises a membrane with a porosity rating between about 5,000 and 1,000,000 MWC.

18. The process of claim 1, wherein said foam fractionation step comprises bubbling a gas through said solution in order to create a foam.

19. The process of claim 1, further comprising the step of treating the surfactant/organic solute aggregate in order to desorb said at least one organic solute from the surfactant.

20. The process of claim 19, wherein said treating step comprises stripping of said aggregate by removing excess water therefrom by distillation.

21. The process of claim 20, wherein said at least one organic solute is a voltile solute and said stripping step further includes removing said at least one volatile solute by distillation.

22. The process of claim 20, wherein said treating step further comprises extracting said aggregate with an organic solvent.

23. The process of claim 22, wherein said solvent is selected from the group including alkanes having between 6 and 10 carbon atoms, lower alcohols and lower ketones.

* * * * *